United States Patent
Lee et al.

(10) Patent No.: US 12,412,169 B2
(45) Date of Patent: Sep. 9, 2025

(54) MAINTAINING BLOCKCHAIN STATE WHEN PERFORMING NON-BLOCKCHAIN COMMERCE WORKFLOW

(71) Applicant: Shopify Inc., Ottawa (CA)

(72) Inventors: John Jong-Suk Lee, Waterloo (CA); Cory Svensson, North Bay (CA); Alan Ashley Fulks, Kelowna (CA)

(73) Assignee: Shopify Inc., Ottawa (CA)

( * ) Notice: Subject to any disclaimer, the term of this patent is extended or adjusted under 35 U.S.C. 154(b) by 393 days.

(21) Appl. No.: 17/837,877

(22) Filed: Jun. 10, 2022

(65) Prior Publication Data

US 2023/0401571 A1    Dec. 14, 2023

(51) Int. Cl.
   *G06Q 20/36*     (2012.01)
   *G06Q 20/06*     (2012.01)
   *H04L 9/00*      (2022.01)
   *H04L 9/32*      (2006.01)

(52) U.S. Cl.
   CPC ....... *G06Q 20/3678* (2013.01); *G06Q 20/065* (2013.01); *H04L 9/3213* (2013.01); *H04L 9/50* (2022.05); *G06Q 2220/00* (2013.01); *H04L 2209/56* (2013.01)

(58) Field of Classification Search
   CPC ............. G06Q 20/3678; G06Q 20/065; G06Q 220/00; H04L 9/50; H04L 9/3213; H04L 2209/56

USPC ........................................................... 705/69
See application file for complete search history.

(56) References Cited

U.S. PATENT DOCUMENTS

| | | | |
|---|---|---|---|
| 2017/0124569 A1* | 5/2017 | Revelle | G06Q 20/401 |
| 2020/0160289 A1* | 5/2020 | Mahajan | G06Q 20/02 |
| 2021/0019303 A1* | 1/2021 | Gangwar | G06N 20/00 |
| 2021/0350458 A1* | 11/2021 | Gaur | G06Q 40/02 |
| 2022/0005022 A1* | 1/2022 | Tu | G06Q 20/02 |
| 2022/0084031 A1* | 3/2022 | Hou | G06Q 20/4014 |
| 2022/0300950 A1* | 9/2022 | Yakovlev | G06F 21/31 |
| 2023/0298001 A1* | 9/2023 | Jethmalani | H04L 9/50 705/65 |
| 2023/0385791 A1* | 11/2023 | Ayyagari | G06Q 30/0641 |

FOREIGN PATENT DOCUMENTS

| | | | | |
|---|---|---|---|---|
| CN | 111597256 A | * | 8/2020 | G06F 16/23 |
| KR | 20210074148 A | * | 12/2019 | G06F 16/2365 |

* cited by examiner

*Primary Examiner* — Courtney P Jones
(74) *Attorney, Agent, or Firm* — Rowand LLP

(57) ABSTRACT

A web-based commerce system may maintain a transaction state between the commerce system and a blockchain application for recording transactions involving NFTs on a blockchain. When a buyer intends to purchase an NFT, the commerce system must coordinate on-chain and off-chain processes with a merchant storefront and a blockchain application. Unlike conventional approaches, which perform these various processes in a serial, integrated manner, the commerce system and blockchain application separately execute these operations and perform the off-chain and on-chain processes independently.

32 Claims, 5 Drawing Sheets

FIG. 2

MAINTAINING BLOCKCHAIN STATE WHEN PERFORMING NON-BLOCKCHAIN COMMERCE WORKFLOW

TECHNICAL FIELD

This application generally relates to systems and methods for managing and tracking purchase transactions on an ecommerce platform using blockchain technology.

BACKGROUND

Online shopping experiences involving the purchase, sale, or use of blockchain assets, including cryptocurrencies and non-fungible tokens (NFTs), may require multiple systems to perform various processes to complete transactions (e.g., confirming payment, accessing one or more blockchain or digital wallets, consensus-determinations, minting NFTs). As a result, the various systems must maintain an awareness of the transaction state, for both on-chain and off-chain operations, which taxes resources in conventional approaches.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

FIG. 2 depicts an illustrative embodiment for a home page of an administrator, according to an embodiment.

DETAILED DESCRIPTION

Figure 1:
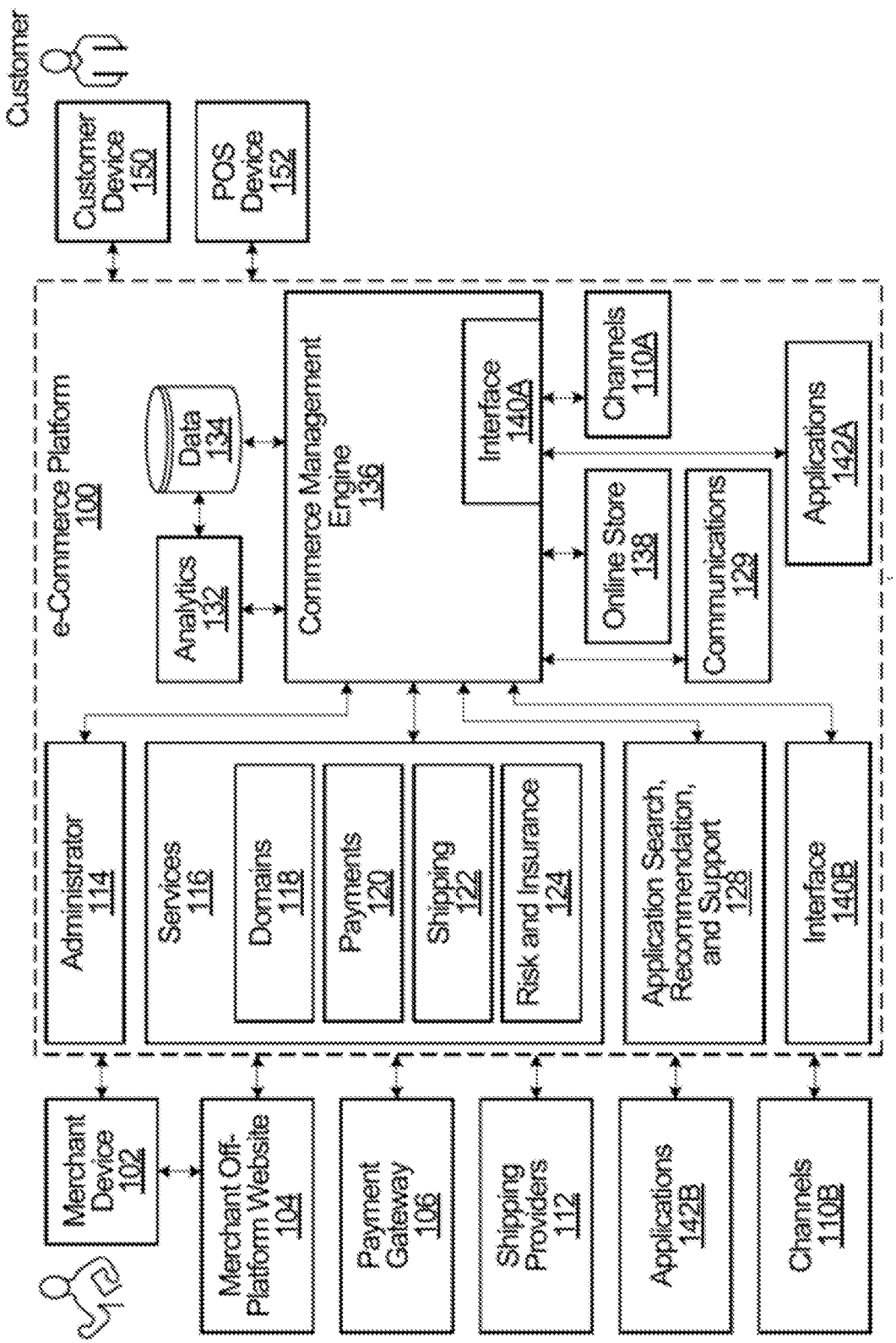
FIG. 1 illustrates an e-commerce platform, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Described herein are systems and methods for generating and tracking purchase transaction information during off-chain and on-chain operations. A web-based commerce system may maintain a transaction state between the commerce system and a blockchain application for recording transactions involving NFTs on a blockchain. When a buyer intends to purchase an NFT, the commerce system must coordinate on-chain and off-chain processes with a merchant storefront and a blockchain application ("blockchain app"). Unlike conventional approaches, which perform these various processes in a serial, integrated manner, the commerce system and blockchain app separately execute these operations and perform the off-chain and on-chain processes independently.

A merchant configures a new NFT offering and smart contract governing minting and sales of the new NFT offering through a web portal. The commerce system generates the smart contract and pushes the smart contract to the blockchain app, but the blockchain app does not mint any NFTs until instructed by the commerce system when a sale is completed. During a purchase transaction for an NFT, the storefront and/or commerce system generate a "product" object representing the NFT. The commerce system or storefront website refers to and/or exchanges parameters for the product object to track the transaction state from the buyer's online cart through payment confirmation. When the transaction state indicates payment confirmation, the commerce system instructs the blockchain app to mint the purchased NFT directly to the blockchain wallet address of the buyer. The blockchain app then executes the smart contract, which includes instructions for performing various verifications (e.g., check limit on NFTs) and minting. In this way, each system actor is aware or sensitive to the transaction state of the product object and the state of the blockchain, even though the commerce system executes the off-chain processes for the online payment transaction separately from the blockchain app executing the on-chain processes for querying the blockchain and minting the NFT.

A merchant who wants to sell a new NFT offering through their merchant storefront (merchant webpage) accesses a configuration webpage hosted by the commerce system, allowing the merchant to submit an NFT creation request along with various configuration inputs. The commerce system (or storefront) also generates a new smart contract for the new NFT offering according to the configuration inputs. In online (off-chain) processes, the commerce system generates a product object representing the new NFT offering. For on-chain processes, the blockchain app mints NFT instances of the new NFT offering when executing the smart contract.

The commerce system deploys the smart contract to the blockchain app, which may be installed on, hosted by, or otherwise connected to the storefront. The blockchain app, in turn, includes the smart contract on the blockchain using the merchant's blockchain wallet address. The commerce system also generates the product object representing the NFT offering in one or more databases. The product object includes information about the NFT offering (e.g., price, images, SKU, metadata, description) and a blockchain address of the smart contract as indicated by the blockchain app. The commerce system uses the data contained within the product object for various processes. For example, the commerce system or storefront refers to data of the product object to publish a storefront webpage where buyers may purchase the NFT offering. Optionally, the commerce system instructs the blockchain app to perform various checks to validate the smart contract's configuration and/or the NFT data (e.g., media data) before the commerce system publishes the product object in the storefront.

Further, the commerce system (or other devices) also refers to the product object during a purchase transaction between a buyer's client device and the storefront. The commerce system may query or generate an instance of the product object corresponding to the NFT offering. When the buyer adds the NFT offering to the buyer's cart (a purchase request), the commerce system executes the traditional online payment processes. Optionally, the commerce system may update a transaction state indicator (e.g., "payment complete," "transaction complete," "awaiting payment," "canceled") that is associated with the transaction and/or the product object. When the commerce system receives the payment confirmation, the commerce system instructs the blockchain app to execute the smart contract for minting the newly purchased instance of the NFT offering to the buyer's blockchain wallet address.

The smart contract includes machine-readable code executed by the blockchain app that governs how the blockchain app mints newly purchased instances of the NFT offering. For example, the smart contract may include a limitation on the number instances of the NFT that the blockchain app mints, thereby maintaining a desired scarcity. In such configurations, the blockchain app may execute the smart contract (or other instructions) at some point in time during the online transaction (e.g., when the buyer adds the NFT offering to their cart; when the commerce system instructs the blockchain app to mint the NFT), causing the blockchain app to compare the number of minted instances of the particular NFT against the limitation in the smart contract.

On the buyer-side of the purchase, the buyer device adds the NFT to a cart, which may cause the commerce system (or the storefront or buyer device) to create an "order" object that contains transaction parameters. In some cases, the order object contains information about the particular NFT to be minted, which the commerce system uses to interact with the blockchain app for minting the newly purchased NFT. The order object may further include the transaction state indicator for the transaction, allowing the commerce system and blockchain app to remain aware of the transaction state of the transaction and/or state of the NFT processes.

In some embodiments, the commerce system requires the buyer to "claim" the newly purchased NFT instance before the blockchain app mints the NFT to the buyer's wallet and complete the transaction. After the commerce system confirms payment, the commerce system may send a message to the buyer through one or more communication channels (e.g., email, text, phone call), where the message prompts the buyer to claim the purchases NFT. In response to receiving a successful claim from the buyer, the commerce system sends the instructions to the blockchain app to mint to the NFT instance to the buyer's wallet. In response, the blockchain app successfully minting the NFT, the blockchain app communicates to the ecommerce system the status and the ecommerce system updates its product object state to "fulfilled" and may inform the customer e.g. via email or push notification.

In an example implementation, the merchant may implement a flash sale that demands faster transaction processing. Separating and maintaining transaction state awareness and transaction processing between the commerce system and the blockchain app may satisfy these needs.

In some cases, multiple customers may visit the merchant's webpage and trigger any number of purchase requests at any moment. This often occurs during sales events offered by the merchant. Prior approaches that integrated the on-chain and off-chain processes scale poorly. The integrated processes increased the demands on computing resources without any mechanism for balancing the work requirements, and the serial execution of sequentially dependent operations would result in inefficiencies in unnecessary work holdups and growing queues. As described here, when the merchant implements a flash sale that demands faster transaction processing, separating and maintaining transaction state awareness and transaction processing between the ecommerce platform and the blockchain app may address these problems.

Example E-Commerce Platform

In some embodiments, the methods disclosed herein may be performed on or in association with a commerce platform, such as an ecommerce platform. Therefore, an example of a commerce platform will be described by way of introduction.

FIG. 1 illustrates an ecommerce platform 100, according to one embodiment. The ecommerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the ecommerce platform 100 should be understood to more generally support users in an ecommerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the ecommerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The ecommerce platform 100 may provide a centralized system for providing merchants with online resources and facilities for managing their business. The facilities described herein may be deployed in part or in whole through a machine that executes computer software, modules, program codes, and/or instructions on one or more processors, which may be part of or external to the ecommerce platform 100. Merchants may utilize the ecommerce platform 100 for managing commerce with customers, such as by implementing an ecommerce experience with customers through an online store 138, through channels 110A-B, through POS devices 152 in physical locations (e.g., a physical storefront or other location such as through a kiosk, terminal, reader, printer, 3D printer, and the like), by managing their business through the ecommerce platform 100, and by interacting with customers through a communications facility 129 of the ecommerce platform 100, or any combination thereof. A merchant may utilize the ecommerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the ecommerce platform), and the like. However, even these 'other' merchant commerce facilities may be incorporated into the ecommerce platform, such as where POS devices 152 in a physical store of a merchant are linked into the ecommerce platform 100, where a merchant off-platform website 104 is tied into the ecommerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the ecommerce platform 100, where channels 110A may be provided internal to the ecommerce platform 100 or from outside the ecommerce channel 110B. A merchant may sell in their physical retail store, at pop ups, through wholesale, over the phone, and the like, and then manage their sales through the ecommerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online ecommerce offering presence through the ecommerce platform 100, where an online store 138 may refer to the multitenant collection of storefronts supported by the ecommerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The ecommerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the ecommerce platform 100 may be implemented through a processing facility including a processor and a memory, the processing facility storing a set of instructions that, when executed, cause the ecommerce platform 100 to perform the ecommerce and support functions as described herein. The processing facility may be part of a server, client, network infrastructure, mobile computing platform, cloud computing platform, stationary computing platform, or other computing platform, and provide electronic connectivity and communications between and amongst the electronic components of the ecommerce platform 100, merchant devices 102, payment gateways 106, application developers, channels 110A-B, shipping providers 112, customer devices 150, point of sale devices 152, and the like. The ecommerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the ecommerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the ecommerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the ecommerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the ecommerce platform 100 (rather than directly from the merchant). Merchants may use a merchant configurable domain name, a customizable HTML theme, and the like, to customize their online store 138. Merchants may customize the look and feel of their web site through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the ecommerce platform 100, such as for storage by the system (e.g., as data 134). In some embodiments, the ecommerce platform 100 may provide functions for resizing images, associating an image with a product, adding and associating text with an image, adding an image for a new product variant, protecting images, and the like.

As described herein, the ecommerce platform 100 may provide merchants with transactional facilities for products through a number of different channels 110A-B, including the online store 138, over the telephone, as well as through physical POS devices 152 as described herein. The ecommerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the ecommerce platform 100 or in association with external facilities, such as through a payment gateway 106 for payment processing, shipping providers 112 for expediting the shipment of products, and the like.

In some embodiments, the ecommerce platform 100 may provide for integrated shipping services 122 (e.g., through an ecommerce platform shipping facility or through a third-party shipping carrier), such as providing merchants with real-time updates, tracking, automatic rate calculation, bulk order preparation, label printing, and the like.

Figure 2:
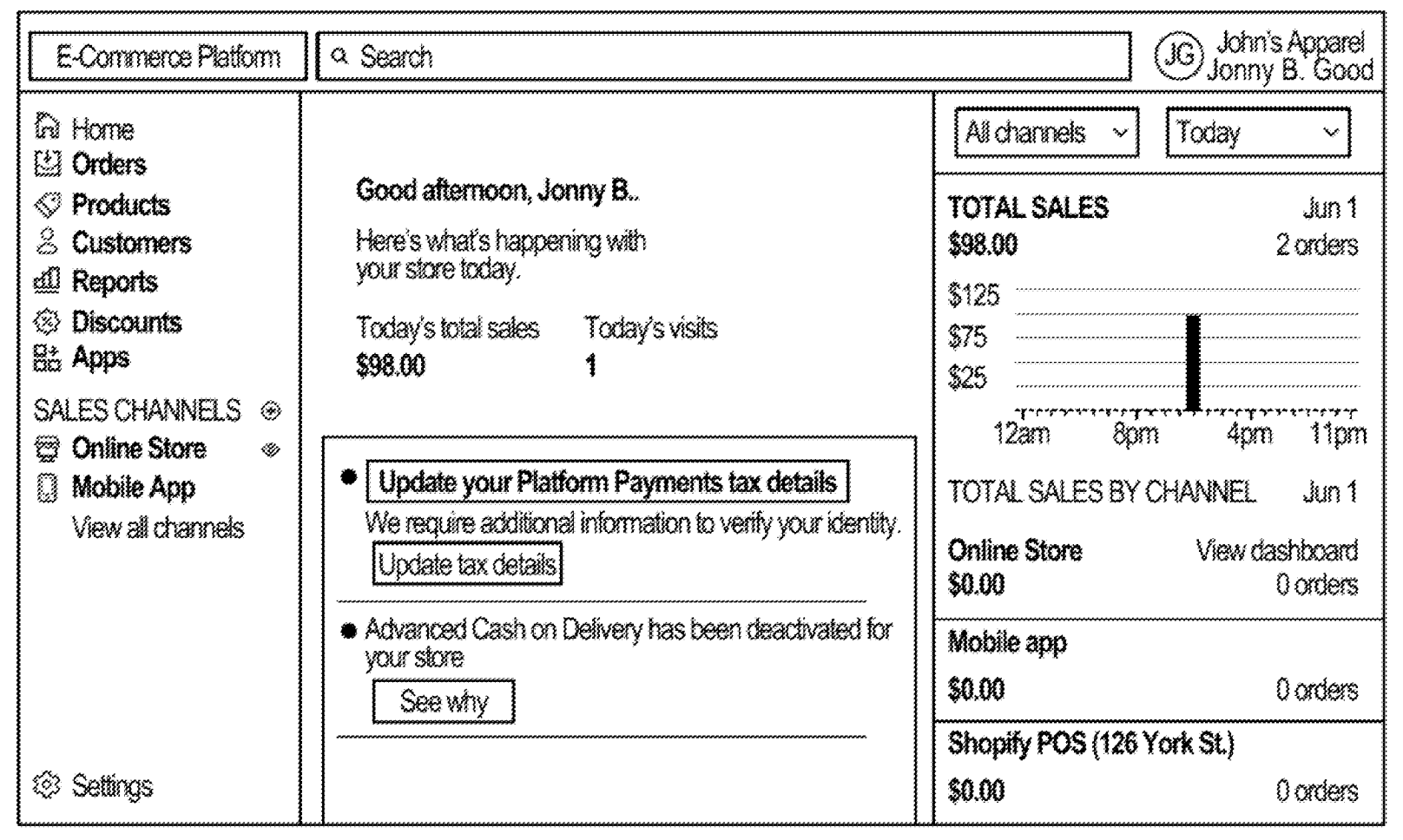

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports, and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g., via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The ecommerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The ecommerce platform 100 may provide a financial facility 120 for secure financial transactions with customers, such as through a secure card server environment. The ecommerce platform 100 may store credit card information, such as in payment card industry data (PCI) environments (e.g., a card server), to reconcile financials, bill merchants, perform automated clearing house (ACH) transfers between an ecommerce platform 100 financial institution account and a merchant's bank account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the ecommerce platform 100 may provide for a set of marketing and partner services and control the relationship between the ecommerce platform 100 and partners. They also may connect and onboard new merchants with the ecommerce platform 100. These services may enable merchant growth by making it easier for merchants to work across the ecommerce platform 100. Through these services, merchants may be provided help facilities via the ecommerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the ecommerce platform 100. In some embodiments, the ecommerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The ecommerce platform 100 may store information about business and merchant transactions, and the data facility 134 may have many ways of enhancing, contributing, refining, and extracting data, where over time the collected data may enable improvements to aspects of the ecommerce platform 100.

Referring again to FIG. 1, in some embodiments the ecommerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the ecommerce platform 100 or applications 142B from outside the ecommerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the ecommerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the ecommerce platform 100 or through interfaces 140B provided to applications 142B and/or channels 110B outside the ecommerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the ecommerce platform 100.

In some embodiments, the ecommerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if the customer has never been there before, the platform payment facility 120 may recall their information to enable a more rapid and correct check out. This may provide a cross-platform network effect, where the ecommerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the ecommerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the ecommerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the ecommerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the ecommerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the ecommerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the ecommerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the ecommerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the ecommerce platform 100, and the like), or an application 142A or 142B being developed by internal personal resources associated with the ecommerce platform 100. In some embodiments, applications 142A-B may be assigned an application identifier (ID), such as for linking to an application (e.g., through an API), searching for an application, making application recommendations, and the like.

The commerce management engine 136 may include base functions of the ecommerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the ecommerce platform 100 may allow for an increasing number of merchant experiences to be built in applications 142A-B so that the commerce management engine 136 can remain focused on the more commonly utilized business logic of commerce.

The ecommerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information, such as an email address, billing information, and shipping details. On checkout, the merchant commits to pricing. If the customer inputs their contact information but does not proceed to payment, the ecommerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10," and entitlements may be items such as "a 20% discount on the whole order" or "$10 off products X, Y, and Z."

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery.

In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that does not provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

In some embodiments, receiving payment or payment information may trigger the risk assessment operations, which may in turn trigger certain fulfillment operations. As an example, the risk assessment operations may determine that there is a permissible amount or category of risk based on information received for the order. As another example, payment operation or blockchain operation may determine that the customer or the merchant have access rights and "own" the requisite blockchain-related wallet, payment blocks (e.g., crypto-currency), or purchased blocks (e.g., NFTs). In some implementations, software executed by the merchant device 102, a server of the ecommerce platform system 100, or the customer device 150, such as a browser, application associated with or published by the ecommerce platform 100, or a payment application (e.g., blockchain application, banking application), may perform the payment operations or fulfillment operations. In some embodiments, receiving the payment or payment information may directly trigger the fulfillment operations, where the payment application or the blockchain application may monitor for the updates to the banking transactions (e.g., ACH payment, money transfer) or the blockchain (e.g., minting NFT, transferring crypto-currency ownership between wallets).

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the ecommerce platform 100 may make the merchant aware of compliance issues with respect to legal obligations (e.g., with respect to taxes). In some embodiments, the ecommerce platform 100 may enable merchants to keep track of changes to the contract of sales over time, such as implemented through a sales model component (e.g., an append-only date-based ledger that records sale-related events that happened to an item).

Components of Illustrative System

Figure 3A:
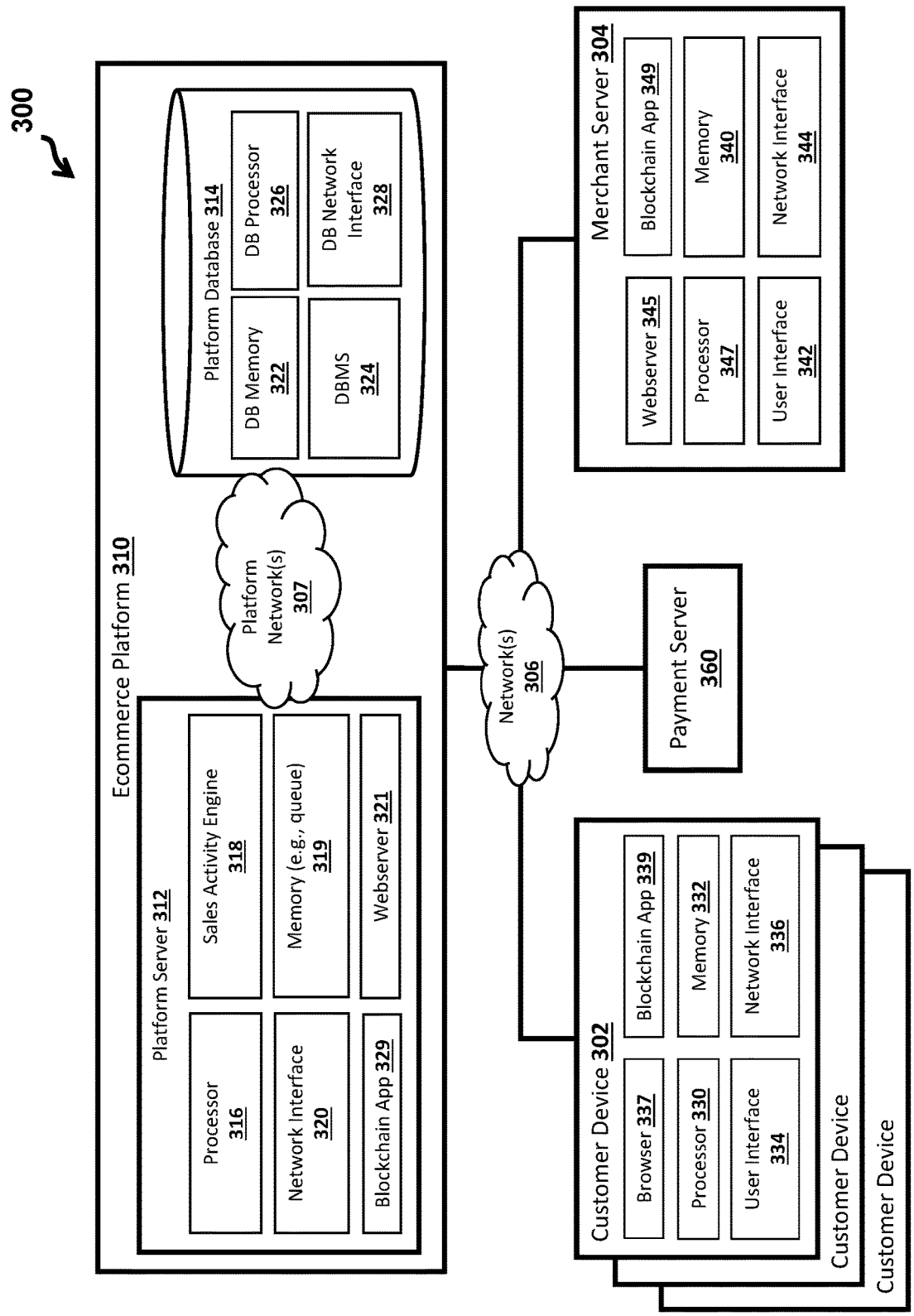
FIG. 3A shows components of an illustrative system, according to an embodiment.
Figure 3B:
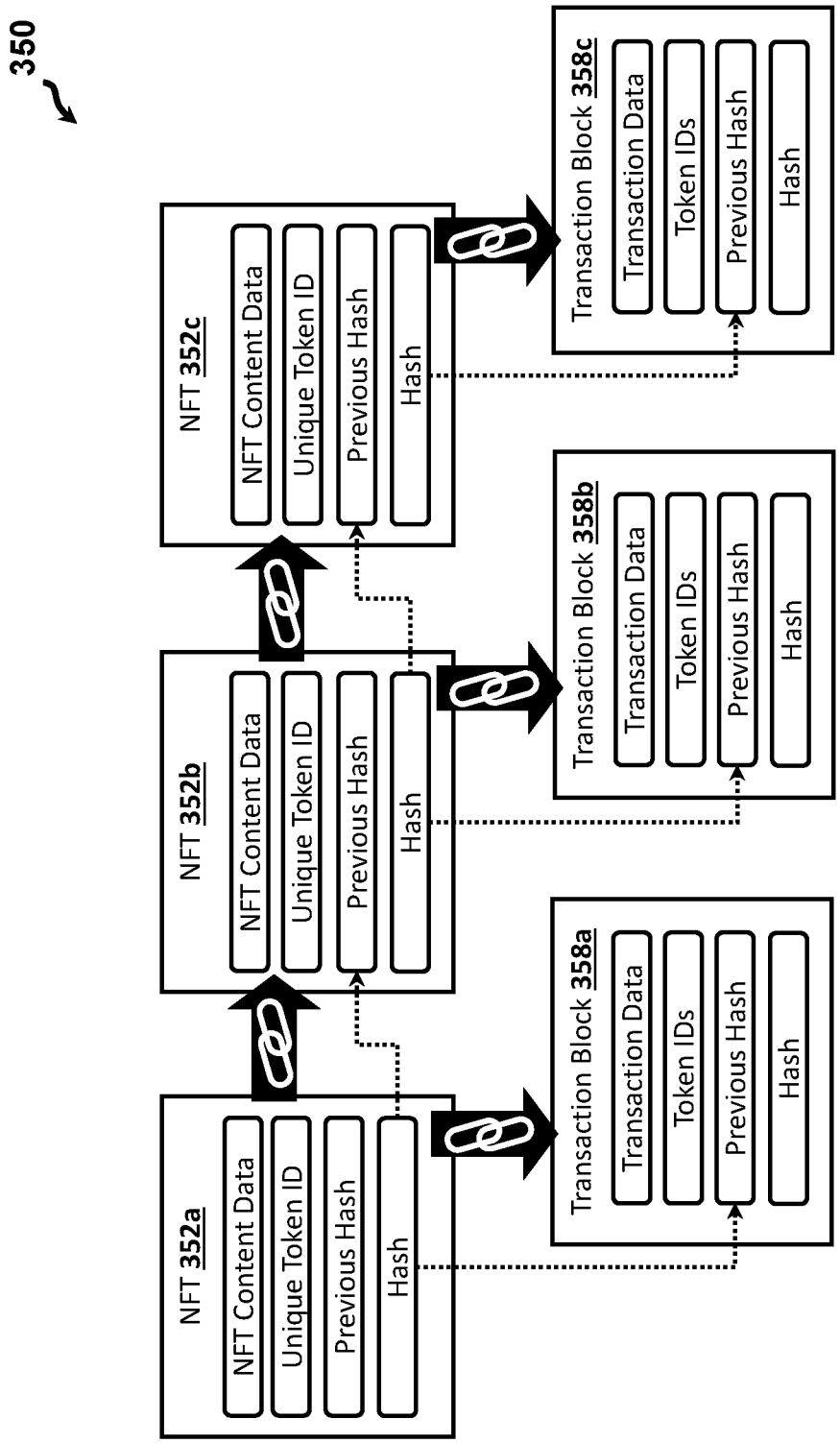
FIG. 3B shows an example blockchain implemented by the system, according to an embodiment.

FIG. 3A shows components of a system 300 according to an embodiment. The system 300 includes customer devices 302, merchant servers 304, and ecommerce platform 310, each of which may communicate with another via one or more networks 306. The ecommerce platform 310 implements a blockchain 350 for tracking purchase activities and mining various types of information about customers of the ecommerce platform 310. FIG. 3B illustrates various types of entries (e.g., blockchain blocks, NFTs) of the blockchain 350 implemented by the system 300. The system 300 is described and shown in FIGS. 3A-3B as having one of each component for ease of description and understanding of an example. It should, however, be appreciated that embodiments may include any number of the components described herein. It should be further appreciated that embodiments may comprise additional or alternative components, or may omit certain components, and still fall within the scope of this disclosure.

Example Parts of Blockchain

The computing devices of the system 300, including the customer devices 302, may execute a blockchain software application (blockchain app 329, 339, 349) for executing various processes for blockchain activities to participate as nodes of a blockchain 350, though embodiments may implement any form of distributed ledger, such as a ledger table. As shown in FIG. 3B, the blockchain 350 may include any number of entries, or blocks, representing various types of data, such as data about customers, merchants, and transactions. The blockchain 350 includes one or more types of blocks, including any number NFTs 352a-352c (collectively or generally referred to as an NFT 352 or NFTs 352). In some embodiments, the 350 may include various types of optional blocks, such as transaction blocks 358a-358c (collectively or generally referred to as a transaction block 358 or transaction blocks 358), among others. A blockchain block is a discrete unit of data entered to the blockchain 350. The block contains various types of related data such that the block represents a certain type of information relevant to the blockchain 350. The block's data also includes various cryptographic identifiers that associate the block with the blockchain 350. For example, a first NFT 352a includes a unique hash, and a second NFT 352b includes a previous hash value based on the hash of the first NFT 352a. The second NFT 352b may also include a unique hash. This is merely an example and not limiting on potential data values or algorithms for the blocks. NFTs 352 are a type of blockchain block that includes more uniquely identifying data, typically requiring more computationally expensive algorithmic operations to generate. The NFTs 352 often contain unique or limited-release information (NFT content data, Unique Token ID) and/or represent unique off-chain assets (e.g., unique or quasi-unique products), because unique data entries, unique identifiers, and/or unique off-chain assets render the NFTs 352 as non-fungible—not freely interchangeable with other blocks of the blockchain 350. Moreover, FIG. 3B depicts the NFTs 352 as consecutive blocks of the blockchain 350 for explanatory purposes. However, in potential embodiments, the NFTs 352 need not be chained to the next or subsequent NFTs 352.

In some implementations, the blockchain 350 includes transaction blocks 358 that include transaction data for particular purchase transactions, when customers purchased corresponding NFTs 352. The blockchain 350 may contain a plurality of transaction blocks 358 containing the transaction data related to the NFTs 352. In a configuration, the transaction blocks 358 may include pointers to respective off-chain storage memory locations that actually contain the transaction data. A blockchain app 329, 339, 349 may mint NFTs 352 of the blockchain 350 using algorithms that take multiple cryptographic values (e.g., encryption key, digital signature, digital certificate, salt, seed) and unique types of data (e.g., content data) to output the one or more unique identifiers. Each NFT 352 includes content data based upon an NFT product offered by a particular merchant through the merchant's online store, furthering the uniqueness of the particular NFT 352 entered to the blockchain 350. The NFTs 352 are not feasibly interchangeable or exchangeable with other blocks or NFTs 352 in the blockchain 350 or in another blockchain (not shown). Nevertheless, the terms "NFT," "token," and "blockchain block" merely refer to examples of entries of the blockchain 350 and do not limit potential embodiments. For example, in some embodiments the products offered by the merchant may be purchased and generated as typical blockchain blocks, rather than purchased and minted as NFTs 352 (as in the blockchain 350). In another example, the transaction blocks 358 may be minted as NFT blocks, rather than generated as typical blockchain blocks (as in the blockchain 350).

The blocks of the blockchain 350 may include typical blockchain blocks, NFTs, or entries to a ledger table, or any combination thereof. As an example, when the customer purchases a first NFT 352a from a merchant, the merchant blockchain app 349 executed by the merchant server 304 mints the first NFT 352a directly to a crypto or blockchain wallet address of the customer. In this example, the blockchain 350 includes transaction blocks 358 generated by one or more of the blockchain apps 329, 339, 349. The transaction blocks 358 represent the transaction data associated with the particular purchase transactions for the NFTs 352. The system 300 may implement any number of open source or proprietary blockchain program apps 329, 339, 349, standards (e.g., ERC-721, ERC-1155), platforms, and protocols, such as Ethereum, EOS, and Flow, where the participating nodes execute the blockchain apps 329, 339, 349 generate the various blocks of the blockchain 350 according to the processes for generating interrelated blockchain blocks (e.g., transaction blocks 358) or NFTs 352.

Network(s)

The one or more networks 306 include any number of public networks and/or private networks, which could include computing networks or telecommunications networks. The network 306 comprises hardware and software components implementing various network and/or telecommunications protocols facilitating communications between various devices, which may include the devices of the system 300 or any number of additional or alternative devices not shown in FIG. 3A. For example, the network 306 includes a cellular network, a Wi-Fi network (or other wired local area network (LAN) or wireless LAN), a WiMAX network or other wireless or wired wide area network (WAN), and the like. The network 306 may also facilitate communication with external servers of other external (or third party) services coupled to the network 306, such as servers hosting a social media platform or a payment transaction platform, such as the payment server 360, associated with a payment gateway (e.g., payment gateway 106 of FIG. 1).

The network 306 may include any number of security devices or logical arrangements (e.g., firewalls, proxy servers, DMZs) to monitor or otherwise manage web traffic to the ecommerce platform 310. Security devices may be configured to analyze, accept, or reject incoming web requests from customer devices 302 or merchant servers 304. In some embodiments, a security device may be a physical device (e.g., a firewall). A security device may be a software application (e.g., Web Application Firewall (WAF)) hosted on, or otherwise integrated into, another computing device of the system 300. The security devices monitoring web traffic are associated with, and administered by, the ecommerce platform 310.

Payment Gateway

The system 300 may include payment servers 360 of the payment gate that offer payment transaction services and manage the payments between the customers and merchants. The payment server 360 may be a component of the computing system infrastructure of the payment gateway. The payment server 360 (or other components of the payment gate) may receive various forms of transaction information from the ecommerce platform 310, customer device 302, and merchant devices 304, and process the payments of customers attempting to purchase products (e.g., NFT products) from the merchants via the ecommerce platform 310. In some embodiments, the payment gateway (and payment server 360) may be a component of the e-commerce platform 310 or the merchant devices 304. The payment server 360 may include one or more computing devices comprising one or more processors, non-transitory storage medium, and software capable of performing the various processes and tasks described herein.

In some embodiments, the payment server 360 may receive transaction information from the platform server 312 of the e-commerce platform 310 for a particular transaction, such as a payment transaction when the customer attempts to purchase an instance of an NFT 354 offered by the merchant on the e-commerce platform 310. The transaction information may include, for example, the customer's payment details, information about the customer, and information about the merchant. The payment server 360 may perform the various operations for conducting the transaction using the customer transaction information and processing the payment from the customer to the merchant. The platform server 312 may return a notification to the platform server 360 or other devices of the system 300 indicating the result of payment processes performed by the platform server 312 (e.g., completed, failed, denied, insufficient funds).

Ecommerce Platform

The ecommerce platform 310 is a computing system infrastructure owned and managed by an ecommerce service and, in some embodiments, may be the same as or similar to that described with reference to FIG. 1, though this need not be the case. The ecommerce platform 310 includes electronic hardware and software components capable of performing various processes, tasks, and functions of the ecommerce platform 310. For instance, the computing infrastructure of the ecommerce platform 310 may comprise one or more platform networks 307 interconnecting the components of the ecommerce platform 310. The platform networks 307 may comprise one or more public and/or private networks and include any number of hardware and/or software components capable of hosting and managing the networked communication among devices of the ecommerce platform 310.

The ecommerce platform 310 comprises the platform server 312 and the platform database 314, though embodiments may include additional or alternative components capable of performing the operations described herein. The components of the ecommerce platform 310 may be embodied in separate computing devices interconnected via one or more public and/or private internal networks of the one or more platform networks 307, while some components of the ecommerce platform 310 may be integrated into a single device. For instance, the platform server 312 could host the platform database 314, even though such integration is not shown in FIG. 3A.

Furthermore, the ecommerce platform 310 may include any number of platform servers 312 (described further below) configured to serve various functions of the ecommerce platform 310. For ease of discussion, the ecommerce platform 310 of the system 300 illustrated by FIG. 3A shows one platform server 312 performing the various functions of the ecommerce service. Potential embodiments are, however, not limited to the description of the system 300 or the illustration of FIG. 3A and may include any number of computing devices functioning as any number of platform servers 312. The software and hardware of the platform server 312 may be integrated into a single distinct physical device (e.g., a single platform server 312) or may be distributed across multiple devices (e.g., multiple platform servers 312). For example, some operations may be executed on a first computing device while other operations may be executed on a second computing device, such that the functions of the platform server 312 are distributed among the various computing devices. In some implementations, the platform server 312 may be a virtual machine (VM) that is virtualized and hosted on computing hardware configured to host any number of VMs.

Platform Database

The platform database 314 stores and manages data records concerning various aspects of the ecommerce platform 310, including information about, for example, customers, merchants, transactions, electronic devices associated with system 300, merchant offerings (e.g., products, inventory, services), various metrics and statistics, machine-learning models, merchant pages hosting merchant stores, and other types of information related to the ecommerce platform 310. The platform database 314 is hosted on any number of computing devices having a processor (sometimes referred to as a database (DB) processor 326) and non-transitory machine-readable memory configured to operate as a DB memory 322, and capable of performing the various processes and tasks described herein. For example, one or more platform servers 312 may host some or all aspects of the platform database 314.

The computing device hosting the platform database 314 may further include a DB network interface 328 for communicating via platform networks of the ecommerce platform 310. The structure of the DB network interface 328 will depend on how the hardware of the platform database 314 interfaces with other components of the ecommerce platform 310. For example, the platform database 314 may be connected to the platform network 307 with a network cable, the DB network interface 328 may include, for example, a NIC, a computer port, and/or a network socket. The DB processor 326 directly performs or instructs all of the operations performed by the platform database 314. Non-limiting examples of such operations include processing queries or updates received from platform servers 312, customer devices 302, and/or merchant servers 304; preparing information for transmission via the platform network and/or the external networks 306; and processing data received via the platform network and/or the external networks 306. The DB processor 326 may be implemented by one or more processors that execute instructions stored in the DB memory 322 or other non-transitory storage medium. Alternatively, some or all of the DB processor 326 may be implemented using dedicated circuitry, such as an ASIC, a GPU, or a programmed FPGA.

Moreover, a computing device hosting the platform database 314 may include and execute database management system (DBMS 324) software, though DBMS 324 is not required in every configuration. The platform database 314 can be a single, integrated database structure or may be distributed into any number of database structures that are configured for some particular types of data needed by the ecommerce platform 310. For example, a first database could store user credentials and be accessed for authentication purposes, and a second database could store raw or compiled machine-readable software code (e.g., HTML, JavaScript) for webpages such that the DB memory 322 is configured to store information for hosting webpages. The DB memory 322 of the platform database 314 may contain the recipient data records, transaction data records, and/or merchant data records. The platform server 312 may issue queries to the platform database 314 and updates based upon, for example, merchant transaction records or new user records (e.g., new buyer, new recipient) of the ecommerce platform 310. The platform database 314 further stores various types of data received from customer devices 302 or merchant servers 304.

The DB memory 322 of the platform database 314 stores various types of information about the customers, merchants, and transactions, which the platform server 312 or merchant server 304 may access when performing certain operations.

Platform Server

The platform server 312 may be any computing device that comprises a server processor 316 and non-transitory machine-readable storage media (e.g., server memory 319) and that is capable of executing the software for one or more functions, such as a sales activity engine 318. The server memory 319 may store or otherwise contain the computer-executable software instructions, such as the sales activity engine 318. The software and hardware components of the platform server 312 enable the platform server 312 to perform the various operations described herein. For example, the platform server 312 executes platform webserver software 321 (e.g., Apache®, Microsoft IIS®) for hosting webpages, websites, and various web-based services. As another example, the platform server 312 may execute software for monitoring and analyzing data traffic between customer devices 302, merchant servers 304, and the ecommerce platform 310. These are merely examples and are not intended to be limiting as to the potential arrangements or functions of the platform servers 312. Non-limiting examples of the platform server 312 may include desktop computers, laptop computers, and tablet devices, among others. In addition, the sales activity engine 318 need not be a component of the platform server 312 or the ecommerce platform 310. In some embodiments, the sales activity engine 318 is a component of and executed by the merchant server 304.

The sales activity engine 318 (or other software component) of the platform server 312 may perform various transactional operations of platform server 312. The platform server 312 may execute the sales activity engine 318 when, for example, conducting purchase transactions between the customer and merchant, where the customer intends to purchase an NFT 352, which is an instance of an NFT product offered by the merchant. The platform server 312 may maintain (e.g., store in the server memory 319) a transaction state and other transaction information for a given purchase transaction. Using the transaction state and transaction information, the platform server 318 may perform or facilitate the various off-chain operations for conducting and concluding the transaction, such as a gather the payment transaction information and communicating the payment information between the payment gateway and the other devices (e.g., customer device 302, merchant device 304) of the system 300. In parallel, the platform server 310 may communicate various blockchain-related instructions and/or transaction data with the merchant blockchain app 349 (or other instance of the blockchain app 329, 339, 349). For example, the platform server 312 may instruct the merchant blockchain app 349 to perform various blockchain-related operations (e.g., verify whether an amount of previously minted NFTs 342 of the NFT product met a threshold; verify the customer's purported wallet address; mint the NFTs 342 to the blockchain 350), and the platform server may capture the customer's payment information and communicate with the payment gateway. In this way, the platform server 312 and the blockchain app 329, 339, 349 may separately and independently execute the off-chain and on-chain processes.

The platform server 312 or platform webserver 321 may host a configuration web portal allowing merchants to submit requests for new NFT products. A merchant configures a new NFT offering and smart contract governing minting and sales of the new NFT offering through the web portal, which the merchant submits as a new NFT creation request. The platform server 312 generates the smart contract and pushes the smart contract to the blockchain app 329, 349, which in turn pushes the smart contract to the blockchain 350. In some implementations, however, the blockchain app 329, 349 does not mint any NFTs until instructed by the platform server 312 that, for example, the payment server 360 or merchant server 304 transmitted a message to the platform server 312 indicating successful payment confirmation.

The platform server 312 mints (i.e., generates and issues) the NFTs associated with purchase activity, where the NFTs represent various aspects of the purchase transaction. Additionally or alternatively, the merchant server 304 mints the set of NFTs for purchase activity occurring at the corresponding merchant online store hosted on the merchant server 304, though for ease of description the platform server 312 mints the NFTs and generates the transaction blocks 358. The platform server 312 generates the NFTs or other blocks for a particular purchase transaction according to default configurations or configurations received from the merchant server 304 (or other device of the merchant). In operation, when the customer confirms a purchase transaction on the merchant online store, the merchant server 304 sends transaction data to the platform server 312. The platform server 312 determines whether a product associated with the purchase transaction requires new NFTs, and which NFTs to generate, according to the configurations corresponding to merchant data or product data stored in the server memory 319 or the DB memory 322.

For the particular purchase transaction, the platform server 312 instructs one or more blockchain apps 329, 339, 349 to generate one or more new blocks of the blockchain 350 using the transaction data received from the merchant server 304, according to a configuration of the NFT product and any smart contract configuration. In a configuration, a merchant blockchain app 349 generates instances of the NFTs 342, as well as the transaction block 358 in some embodiments. The merchant blockchain app 349 algorithmically generates one or more identifier or hash values for the various new blocks (e.g., blockchain block, NFT 342). For example, each block of the blockchain 350 includes the previous hash value of the preceding block and a new hash value, based in part on the previous hash value and/or data of the particular new block. As another example, the NFTs 342 may include unique token identifiers that uniquely identify each particular NFT 342 and render the particular NFT non-fungible and non-interchangeable with other blockchain blocks or NFTs 342 of the blockchain 350.

The transaction block 358 represents the various types of transaction data, such as the party identifiers (e.g., merchant identifier, customer identifier), a product identifier, and token identifiers associated with the NFTs 342 of the purchase transaction, among others. The merchant blockchain app 349 may generate the transaction blocks 358 on a portion of the blockchain 350 parallel from (or in-line with) the NFTs 342 of the particular transaction. A particular transaction block 358 may further include the preceding hash of the corresponding NFT 342 and a new hash.

Customer Devices and Merchant Servers

Merchant servers 304 are electronic devices associated with merchant accounts of the ecommerce platform 310 and host online merchant stores of a particular merchant. Customer devices 302 are electronic devices associated with users (sometimes referred to herein as "client users" or "customers") who are not operating as merchants, where such user may include end-point customers or potential customers, and who are visiting the online stores of the merchants on the ecommerce platform 310. In some circumstances, the merchant server 304 and the customer device 302 can be the same computing device. For example, a merchant-user may sometimes act as a customer-user navigating webpages of another online merchant store website associated with the ecommerce platform 310. In this example, the customer device 302 functions as the merchant server 304, though the customer device 302 may function as a particular customer device 302 at other times. The merchant-user may use the same computing device to both configure the settings for the online merchant store (or other configuration settings) and then browse the online stores of other merchants on the ecommerce platform 310.

The customer device 302 may be a mobile phone, tablet, laptop, or computer operated by or otherwise associated with the customer-user. The customer device 302 includes a customer processor 330, customer memory 332, customer user interface 334, and customer network interface 336. The customer user interface 334 includes, for example, a display screen (which may be a touch screen) and graphical user interface (GUI), a gesture recognition system, a keyboard, a stylus, and/or a mouse. The customer network interface 336 comprises hardware and software programing for the customer device 302 to communicate over the one or more networks 306. The structure of the customer network interface 336 will depend on how the customer device 302 interfaces with the network 306. For example, if the customer device 302 is a mobile phone or tablet, the customer network interface 336 may include a transmitter/receiver with an antenna to send and receive wireless transmissions to/from the network 306. If the customer device 302 is a personal computer connected to the network 306 with a network cable, the customer network interface 336 may include, for example, a network interface card (NIC), a computer port, and/or a network (hardware, software, or logical) socket. The customer processor 330 directly performs or instructs all of the operations performed by the customer device 302. Non-limiting examples of these operations include processing user inputs received from the customer user interface 334, preparing information for transmission over the network 306, processing data received over the network 306, and instructing a display screen to display information via the GUI of the customer user interface 334. The customer processor 330 may be implemented by one or more processors that execute instructions stored in the customer memory 332. Alternatively, some or all of the customer processors 330 may be implemented using dedicated circuitry, such as an ASIC, a GPU, or a programmed FPGA.

The merchant server 304 may be a mobile phone, tablet, laptop, or computer used by a merchant. The merchant server 304 includes a merchant processor 347, merchant memory 340, a merchant user interface 342, and a merchant network interface 344. An example of a merchant user interface 342 is a display screen (which may be a touch screen) and graphical user interface (GUI), a keyboard, a gesture recognition system, a stylus, and/or a mouse. The merchant network interface 344 is provided for communicating over the network 306. The structure of the merchant network interface 344 will depend on how the merchant server 304 interfaces with the network 306. For example, if the merchant server 304 is a mobile phone or tablet, the merchant network interface 344 may include a transmitter/receiver with an antenna to send and receive wireless transmissions to/from the network 306. If the merchant server 304 is a personal computer connected to the network 306 with a network cable, the merchant network interface 344 may include, for example, a NIC, a computer port, and/or a network socket. The merchant processor 347 directly performs or instructs all of the operations performed by the merchant server 304. Examples of these operations include processing user inputs received from the merchant user interface 342, preparing information for transmission over the network 306, processing data received over the network 306, and instructing a display screen to display information via the GUI of the merchant user interface 342. The merchant processor 347 may be implemented by one or more processors that execute instructions stored in the merchant memory 340. Alternatively, some or all of the merchant processor 347 may be implemented using dedicated circuitry, such as an ASIC, a GPU, or a programmed FPGA.

The merchant server 304 includes software and hardware components enabling Internet or other forms of networked communication with components of the system 300 (e.g., platform server 312, customer device 302), as well as enabling the merchant server 304 to perform the various functions described herein. For example, the merchant server 304 executes merchant webserver software 345 (e.g., Apache®, Microsoft IIS®) to generate and present merchant webpages or other merchant information to the customer device 302 for the merchant's website, which includes the merchant's online store. These are merely examples and not intended to be limiting as to the potential arrangements or functions of the merchant server 304.

The merchant server 304 includes the merchant blockchain app 349, which is software executed by the merchant server 304 for performing various on-chain blockchain-related operations. The merchant blockchain app 349 performs the on-chain processes independent of the off-chain web-based processes performed by the platform server 312 and other devices of the system 300, though the merchant server 304 and merchant blockchain app 349 may receive instructions, update notifications, or other forms of data from the platform server 312, which inform the merchant blockchain app 349 on certain operations, such as minting new NFTs 342.

A merchant who wants to sell a new NFT offering through the merchant's storefront (merchant webpage) may access a configuration webpage or web portal hosted by the platform server 312 or other computing device of the ecommerce platform 310. The merchant may access this NFT configuration portal to configure the NFT product, including configuring the content data, distribution rules, and other content or governance rules. In some implementations, the merchant may submit an NFT creation request along with the various configuration inputs to the platform server 312. The platform server 312 may, or in some cases, the merchant server 304, may automatically generate a new smart contract for the new NFT offering according to the merchant's configuration inputs in the creation request. The new smart contract is a software script that a blockchain app 329, 339, 349 of a participating node executes to perform various on-chain operations, such as minting new instances of the NFT 324. The smart contract may comprise certain controls or limits on the generation of new NFTs 324, such as verifying whether the blockchain app 329, 339, 349 may issue a new instance of the NFT 324 the purchasing customer. The platform server 312 may push the smart contract to the merchant blockchain app 349, and the merchant blockchain app 349 includes the smart contract to the blockchain 350 as a block or as a component of the blocks, using the merchant's blockchain wallet address. The platform database 314 and/or the merchant server 304 may store the configuration inputs associated with the new NFT product.

The platform server 312 may generate product objects representing the NFT offerings of NFT products of the merchants. A product object may be a coded, logical object file (e.g., JSON file, Java object or class, C/C #/C++ object or class). The product object contains attributes of the particular NFT product based upon the configuration inputs that the platform server 312 received in the merchant's corresponding NFT product request. The platform server 312 may store the product objects into a platform database 314. A product object for a new NFT product includes, for example, information about the NFT offering (e.g., price, images, SKU, metadata, description) and a blockchain address of the smart contract as indicated by the platform or merchant blockchain app 329, 349 that included the smart contract to the blockchain 350. The platform server 312 references the data contained within the product object for various web-based off-chain processes associated with the purchase transaction. The merchant blockchain app 349 references the blockchain 350 and executes the smart contract when performing the on-chain blockchain-related processes associated with the purchase transaction and minting newly purchased NFTs 342.

During a purchase transaction for an NFT 342 initiated by the customer device 302, the merchant server 304 or the platform server 312 may generate a product object representing the NFT 352. The merchant server 304 and the platform server 312 website may refer to and exchange parameters using the product object, allowing the merchant server 304 and the platform server 312 to track the state of the purchase transaction. The platform server 312 and the merchant server 304 may perform the various on-chain and off-chain tasks to conduct the purchase transaction. In some cases, certain operations may be dependent upon the status or completion of preceding steps. For instance, an on-chain operation, such as minting the new NFT 352 by the merchant blockchain app 349, may depend upon a successful payment transaction conducted off-chain between the platform server 312 and the payment server 360. In some implementations, the platform server 312 and the merchant server 304 may reference the product object associated with the ongoing purchase transaction to indicate the status of certain operations, exchange data (e.g., completion notifications), and track the transaction state. Non-limiting examples of the transaction state may include: a "purchased status" indicating that the payment for the order has been obtained, an "order fulfilled status" indicating that the NFT 342 has been generated on the blockchain 350 for the order, a "timeout status" indicating that a timer associated with an order object has expired for fulfillment of the NFT order, and a "condition failure" status indicating that a condition for generating the NFT 342 for the order has failed (e.g., according to the smart contract's on-chain verification operations), among others.

When the transaction state indicates payment confirmation, the platform server 312 may provide instructions to the merchant blockchain app 349 to mint the purchased NFT directly to the blockchain wallet address of the buyer. The blockchain app 349 may execute the smart contract, which may include referencing certain types of data in the product object or performing various additional on-chain operations, such as performing verifications (e.g., check threshold amount of NFT instances) and minting the NFT 342. In some implementations, the customer device 302 or the customer blockchain app 339 may query or access the product object to request information about the transaction state. In this way, each system actor may access the transaction state of the product object and the state of the blockchain 350, but the platform server 312 performs the off-chain processes (e.g., conducting online payment transaction) separately from the blockchain app 349 executing the on-chain processes (e.g., querying the blockchain 350 and minting the NFTs 352).

The customer device 302 may execute a software application for navigating the merchant stores available through the ecommerce platform 310, where the software application could be a web browser 337 (e.g., Chrome®, Firefox®, Internet Explorer®) or a native buyer application ("app" or "client app") published by (or otherwise associated with) the ecommerce platform 310 and installed on the customer device 302. The customer device 302 is described as executing the web browser 337 for ease of discussion, though there is no such limitation. When the customer selects the merchant store via the user interface 334 of the browser 337, the customer device 302 connects to the platform server 312 and the merchant server 304 hosting the merchant store webpage using one or more IP Addresses that the customer device 302 obtained by translating a domain name for the merchant store and the merchant server 304. The customer blockchain app 339 may be a separate software application from the client app or the browser 337, which the customer device 302 invokes in response to instructions from the platform server 312 or other software components. In some embodiments, however, the customer blockchain app 339 may be integrated into the client app or the browser 337.

When the customer device 302 visits the online store of a merchant, the platform server 312 of the ecommerce platform 310 serves a catalog of available products offered by the merchant, displayed in a webpage GUI via the browser 337. The browser 337 transmits a request to the ecommerce platform 310 for the product information or webpage of the online store of the merchant. The platform server 312 receives the request for the webpage from the browser 337 and, in return, the platform server 312 and/or the merchant server 304 transmit(s) the requested product webpage of the merchant's online store for display via the browser 337. In operation, the platform server 312 provides a catalog webpage that presents the catalog of available merchant stores or products for display via the browser 337. The customer selects the particular merchant by entering a merchant selection input into the browser 337. In response to this input, the browser 337 transmits a request for a merchant webpage to the platform server 312 and the merchant server 304. The request for the merchant webpage instructs the platform server 312 and merchant server 304 to return the webpage containing the desired merchant information. The customer can then select the particular product of interest by entering a product selection input into the browser 337, causing the customer device 302 to transmit a request for a product webpage to the platform server 312 and the merchant server 304. The request for the product webpage instructs the platform server 312 and the merchant server 304 to return the webpage containing the product information. The browser 337 displays the webpage containing the product information to the customer.

The browser 337 accesses and interacts with the webpages of the merchant's online website. Each webpage of the merchant's online store website comprises various types of content. The machine-readable code of the webpage content includes executable instructions for the browser 337 to perform the various client-side operations, such as displaying visual content of the webpage (via the customer user interface 334), performing certain computations, calling/retrieving data files or executable scripts, or updating various types of data, among other operations performed by the browser 337 or the customer device 302. The webpage content includes the entire webpage, portions of the webpage, or sub-components of the webpage (e.g., applets, containers, elements, frames, features, data objects, data files). The code of the webpage content comprises one or more types of code languages or types of data (e.g., HTML, XML, CSS, PHP, JSON, JavaScript, Python). During execution, the browser 337 parses the code of the webpage content, performs the various operations according to the code, and exchanges data values with the merchant server 304 according to the code of the webpage content. For instance, the browser 337 identifies the call to the script (or other machine-executable code) within the code of the webpage content and then executes the computations of the script.

As an example, the customer device 302 transmits the request for webpage content of the merchant store to the merchant server 304 through the platform server 312. The merchant webserver software 345 executed by the merchant server 304 generates and returns the requested content to the customer device 302. The browser 337 of the customer device 302 parses the machine-readable code (e.g., HTML, XML, JavaScript, PHP, Ruby, Python) of the webpage content and interprets the code into the machine-executable instructions executed by the customer processor 330 to perform various browser-side (or client-side) operations. Non-limiting examples of the browser 337 operations, as interpreted and prompted according to the instructions, may include: displaying certain content via the browser 337 and the customer user interface 334; fetching or calling scripts or data files; or performing the various computations, among other client-side operations.

When the customer device 302 connects with the merchant web server 345 or at a given time thereafter, the browser 337 and the merchant server 304 establish a session (e.g., client-side HTTP session, server-side HTTP session) based on the browser 337 successfully accessing the merchant's webpage of the merchant website. By establishing the session, the browser 337 and/or the merchant webserver 345 will maintain, access, store, and update persistent state information about the ongoing session, enabling the browser 337 and merchant webserver 345 associated with the session to track events and data occurring during the interactions between the browser 337 and the webserver 345. Data traffic between the customer device 302 and the merchant server 304 flows through the ecommerce platform 310, allowing the platform server 312 to monitor and access the data traffic and associate with the session. The various types of information generated during the session, such as the test values or the line items (code representing particular products), are stored into the customer memory 332, the merchant memory 340, platform memory 319, or other non-transitory machine-readable storage medium.

In some embodiments, the customer-buyer may initiate the purchase transaction for an NFT product when visiting the merchant's online store and entering a purchase request. The purchase request is an instruction or indicator that the merchant server 304 generates in response to a particular input from the customer-buyer, such as placing the NFT product into the customer's "cart" or selecting a "checkout" graphical user interface command. The merchant server 304 or the platform server 312 may generate the new instance of the product object associated with the new purchase transaction. When the buyer adds the NFT offering to the buyer's cart (the purchase request), the platform server 312 may execute the off-chain online payment processes using information received from the customer, the merchant, or the product object. In some configurations, the platform server 312 and/or the merchant server 304 (executing the blockchain app 349) may update or exchange a transaction state indicator (e.g., "payment complete," "transaction complete," "awaiting payment," "canceled") for the product object, which indicates transaction state information associated with the ongoing purchase transaction. When the platform server 312 receives the payment confirmation from the payment server 360 or the merchant server 304, and the platform server 312 or the merchant server 304 updates the transaction state indicator, then the platform server may instruct the blockchain app 349 to execute the smart contract for minting the newly purchased instance of the NFT offering to the buyer's blockchain wallet address.

During the purchase transaction, the merchant blockchain app 349 of the merchant server 304 generates and issues (i.e., mints) the NFT 352 directly to the customer's blockchain wallet address. In some circumstance, it may be undesirable for the ecommerce platform 310 or the merchant server 308 to mint the NFTs 352 before customers purchase the NFTs 352, as the ecommerce platform 310 or the merchant server 308 would unnecessarily inherit custody and responsibility over the inventory of the NFT 352. This approach of minting the inventory of NFTs 352 to an intermediate wallet (e.g., seller's wallet, platform wallet, escrow wallet, broker wallet) is a common operational model, but can cause limitations and inefficiencies. This approach is often preferred, however, because the approach enables certain features, such as enforcing a limited number of instances of the NFT product. By disentangling the on-chain processes from the off-chain processes, the NFTs 352 need not be minted prior to the purchase transaction. The platform server 312 may instruct the merchant blockchain app 349 when the transaction state is ready for the merchant blockchain app 349 to mint the newly purchased NFT 352. The merchant blockchain app 349 may execute a smart contract for minting the NFT 352, and confirms the number of previously minted NFTs 342 is below a threshold amount. The merchant blockchain app 349 may then mint the new NFT 342 directly to the blockchain wallet address of the customer.

In some embodiments, the platform server 312 generates an order object used to track the transaction state, in addition or as an alternative to the product object. When the customer device 302 enters a purchase request to the merchant server 304 (e.g., adds the NFT offering to the cart), the platform server 312 or the merchant device 304 may generate an order object that contains transaction parameters. The order object may contain, for example, information about the particular NFT 352 to be minted, which the platform server 312 uses to interact with the blockchain app 329, 349 for minting the newly purchased NFT. The order object may further include the transaction state indicator for the transaction, allowing the commerce system and blockchain app to remain aware of the transaction state of the transaction and/or state of the NFT processes. In such optional embodiments, the transactional parameters may be separated from NFT product parameters for ease of processing and parameter exchanges through increased modularity of the parameters to more tailored representational objects.

In some embodiments, the purchaser must claim the newly purchased NFT 352 via the ecommerce platform 310, before the blockchain app 349 will mint the NFT 352 on the blockchain 350 to the buyer's wallet and complete the purchase transaction. After the platform server 312 receives a payment confirmation message from the payment server 306, the platform server 312 may send a claim message to the buyer through one or more communication channels (e.g., email, text, phone call). The claim message prompts or links the buyer or customer device 302 to access a claiming webpage hosted by the platform webserver 321 to claim the purchased NFT 352. The claiming webpage may include various types of manual and/or automated authorization challenges, such as prompting the user to enter credentials or querying certain metadata (e.g., MAC, IP, browser fingerprint) of the customer device 302. The platform server 312 or webserver 321 may receive and evaluate the inputted authorization data (e.g., compare authorization inputs against corresponding expected authorization inputs stored in the platform database 314) to determine whether to authorize the customer's claim for the NFT 352.

In response to receiving or determining a successful claim from the buyer, the platform server 312 sends the minting instructions to the blockchain app 349 to mint to the NFT instance to the blockchain 350 using the buyer's wallet address. After the blockchain app 349 successfully mints the NFT 342, the merchant server 304 transmits a message to the platform server 312 and/or the customer device 302 indicating the completed status of the minting operation. The platform server 312 or the merchant server 304 may update the transaction state indicator(s) for the order object and/or the product object to "fulfilled." The platform server 312 may further transmit a notification to the customer device 302 via the one or more communication channels (e.g., email, push notification, text), indicating fulfillment of the NFT purchase transaction.

In some embodiments, the merchant server 304 or risk assessment engine (not shown) of the platform server 312 may receive payment or payment information and, in response, may trigger various risk assessment operations that, if successful (e.g., determine acceptable amount of risk), may send order fulfillment instructions triggering the blockchain app 349 to mint the NFT instance to the blockchain 350. As an example, the risk assessment operations may determine that there is a permissible amount or category of risk based on the information received for the order. In some embodiments, receiving the payment or payment information may directly trigger the fulfillment operations by the merchant server 304, where the blockchain app 349 of the merchant server 304 and/or the blockchain app application 339 of the customer device 302 may perform certain risk assessment operations by monitoring and validating updates to the blockchain 350. As an example, the merchant server 304 may determine that the customer or the merchant has access rights and own the requisite blockchain-related wallet(s) and payment blocks (e.g., cryptocurrency amount).

Example Processes for Blockchain Operations with Transaction State

Figure 4:
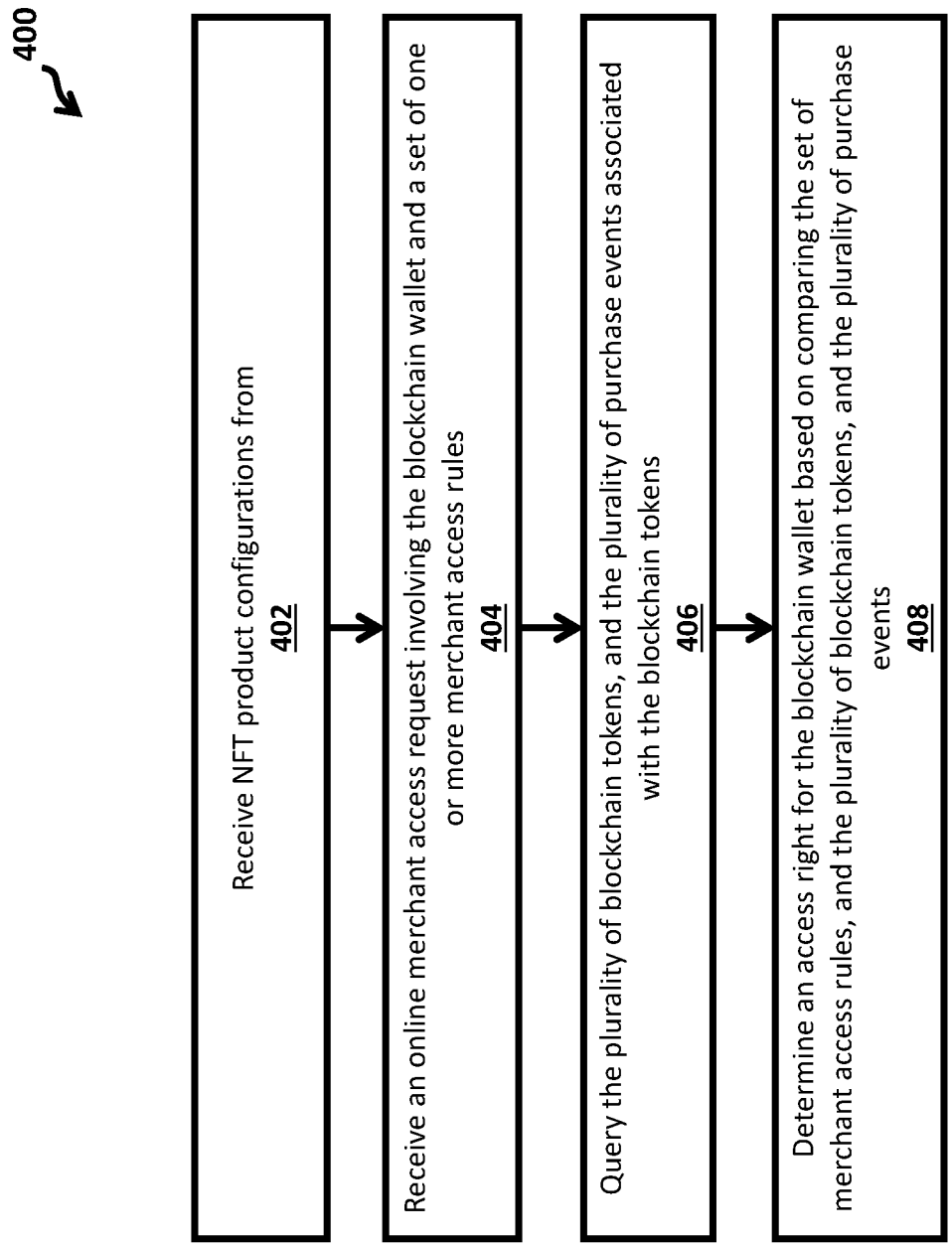
FIG. 4 shows execution steps of a method performed by an ecommerce platform server, according to an embodiment.

FIG. 4 shows execution steps of a method 400 performed by a server (e.g., ecommerce platform server), according to an embodiment. Embodiments may include additional, fewer, or different operations than those described in the method 400. The method 400 is performed by a server, though it should be appreciated that one or more computing devices or processors may perform the various operations described in FIG. 4.

In step 402, the server receives an NFT creation request via a merchant portal configuration webpage, hosted by the ecommerce platform. The NFT creation request includes one or more NFT product configurations indicating various attributes (e.g., types of content data) and executable functions (e.g., governance actions) of the merchant's new NFT product.

In step 404, the server generates a new product object representing the attributes of the new type of NFT product and a new smart contract containing code script for the executable functions. The server may deploy the new smart contract to the blockchain, by transmitting the smart contract to the merchant server and instructing the merchant server's blockchain app to include the smart contract to the blockchain. In response, the merchant blockchain app includes the smart contract on the blockchain using the merchant's blockchain wallet address. The server also generates the product object representing the NFT offering in one or more databases. The product object includes information about the NFT offering (e.g., price, images, SKU, metadata, description) and the blockchain address of the smart contract as indicated by the blockchain app.

The server stores the product object into a database of the platform and/or transmits the product object to the merchant server. The product object may include fields or data indicating the types of parameters that the server and merchant exchange during the purchase transaction. The server or the merchant server may reference and/or update the product object during the purchase transaction and/or during various off-chain operations, to determine or update the state of the transaction and/or determine or update the values of certain types of transaction information. For example, the server or merchant server may reference the product object data when publishing a storefront webpage where the customers may purchase the NFT offering.

In some embodiments, the server instructs the blockchain app to perform various checks to validate the smart contract's configuration and/or the NFT data (e.g., media data) before the server or merchant server publishes the product object in the storefront webpage. For example, the code of the smart contract may include the threshold limitation on the amount of minted instances of the NFT product on the blockchain. The smart contract may include code for an on-chain operation that instructs the blockchain app to determine whether the blockchain already includes the threshold amount of instances. For instance, the blockchain app may increment an instance counter in memory each time that the blockchain app mints another instance successfully, or the blockchain app may query the blockchain to identify and count the amount of minted instances. The blockchain app may determine whether the amount of minted instances meets the threshold amount in the smart contract. The blockchain app may further transmit a message to the platform server or update the transaction state (stored in a memory, in a product object, or in an order object) to indicate a rejection (or similar negative response) or indicate that NFTs remain available for purchase (or similar positive response). Any number of additional or alternative on-chain operations may be coded into the smart contract as executed by the blockchain app.

In step 406, the server receives a plurality of orders via a merchant webpage for the product object that represents the merchant's new NFT product. For instance, the server may receive notification of a purchase request from the merchant server or the customer device. The browser or the merchant server may generate the purchase request in response to the customer entering an input to generate the purchase request. The customer's may operate the graphical user interface presenting interactive webpage elements to enter the instructions for generating the purchase request (e.g., placing the NFT product into the customer's shopping cart). In some cases, the customer device transmits the purchase request to both the merchant server and the platform server. In some cases, the merchant server's web server software may receive and forward the purchase request to the platform server. The merchant server may be configured to trigger and transmit a purchase request notification to the platform server in which the merchant server forwards the purchase request and related information for the purchase transaction. When the customer device submits the purchase request (e.g., customer adds the NFT offering to the buyer's cart), the server may execute the various off-chain online payment processes.

In some cases, multiple customers may visit the merchant's webpage and trigger any number of purchase requests. The merchant server may forward the purchase request notifications to the platform server, in real time, at a preconfigured time interval, or at prescheduled time. The purchase request indicates the NFT product and the corresponding product object. The platform server may reference the product object for each purchase request and store data records of each purchase transaction with the product object and other related data (e.g., merchant information, customer information) into a transaction queue.

Optionally, in step 408, for each order of the plurality of orders, the server generates an order object indicating the product object and a transaction state associated with a particular order of a purchaser. In some embodiments, as in FIG. 4, the computing devices reference an order object for detailed information about the particular, ongoing purchase transaction of a particular customer attempting to purchase a particular instance of the NFT product. In such embodiments, the product object includes information about the NFT product relevant to each of the customers. In this way, the order object is specific to the particular purchase transaction.

In operation, when the customer device submits the purchase request to the merchant server (e.g., buyer device adds the NFT offering to the cart; buyer selects a "checkout" graphical user interface element) the server or the merchant server may generate the order object that contains transaction parameters. The order object contains the information about the particular NFT instance intended for minting by the blockchain app. The server references and updates the order object to interact with the blockchain app for minting the newly purchased NFT. The order object may further include a transaction state indicator for the overall ongoing purchase transaction and/or the status of the various operations. The server and merchant server may reference and update the state indicator and other data fields to exchange status information and parameters corresponding to the data fields. By referencing, updating, and exchanging the information of the order object, the server and the merchant server remain aware of the transaction state and the status of the off-chain operations performed by the platform server (e.g., payment transaction status, payment confirmation) and the on-chain operations performed by the blockchain app according to the smart contract (e.g., confirmation that new NFT instance is permissible, status of minting the new NFT instance).

In step 410, the server instructs blockchain app to mint the new NFT instance to the blockchain, directly to the blockchain wallet address of the customer-buyer. In some embodiments, the blockchain app does not mint instances of the new NFTs at the time that the merchant configured the new NFT product. The blockchain app waits to execute the smart contract (or the portion of the smart contract) for minting instances of the NFTs until the platform server transmits an instruction or confirmation message (e.g., payment confirmation) that instructs the blockchain app to proceed with minting.

For example, when performing the various off-chain operations for processing the customer's payment to the merchant server or to the ecommerce platform, the platform server communicates the payment information to a payment server of a payment gateway server. The platform server awaits a confirmation message from the payment server indicating that the customer payment successfully directed funds to the merchant's bank. In response to receiving the confirmation message from the payment server, the platform server may update the order object and/or product object associated with the ongoing transaction to indicate the payment confirmation. The server may further transmit the minting instruction to the blockchain app to generate the new instance of the NFT on the blockchain, according to the buyer's blockchain wallet address.

In some embodiments, the platform server waits to transmit the minting instruction to the blockchain app until the buyer accesses a claiming website hosted by the platform server and successfully claims the purchased NFT. After the platform server receives the payment confirmation message from the payment gateway or other device (e.g., merchant server), but before transmitting the minting instruction to the blockchain app, the platform server may generate and transmit a claiming message to the customer or customer device(s) via one or more communication channels (e.g., email, text, phone call). The claiming message includes a prompt to the buyer to claim the purchased NFT instance and/or a hyperlink directing the customer device to the claiming website. In a configuration, the platform server may perform one or more authentication operations for authenticating the identity of the customer as the party who actually bought the NFT and/or participated in the purchase transaction. The platform server may detect the web traffic originating from the customer's claiming message and/or authenticate the customer successfully based on the customer's inputs. In some implementations, the platform server may update the transaction state to reflect a "claimed" status.

When the platform server receives the user inputs for claiming the new NFT instance from the customer device (and in some embodiments authenticates the claim successfully), the commerce system may transmit the minting instruction to the blockchain app to mint to the new NFT instance to the buyer's blockchain wallet address. In response, the blockchain app successfully minting the NFT, the blockchain app communicates to the ecommerce system the status and the ecommerce system updates its product object state to "fulfilled" and may inform the customer e.g. via email or push notification.

In some embodiments, a computer-implement method comprises receiving, by a computer, a plurality of orders via a merchant webpage for a product object representing a non-fungible token. For each order of the plurality of orders, generating, by the computer, an order object indicating the product object and a transaction state associated with a particular order of a purchaser. Responsive to an update to the transaction state reflecting that a payment for the particular order has been obtained, transmitting, by the computer, an instruction to a blockchain application to generate the non-fungible token on a blockchain for a blockchain wallet address of the purchaser.

In some implementations, the computer transmits the instruction to the blockchain application to generate the non-fungible token on the blockchain for one or more orders of the plurality of orders having the transaction state reflecting that the payment for each order of the one or more orders has been obtained.

In some implementations, the update to the transaction state reflects that the payment has been obtained without awaiting completion of execution of the instruction by the blockchain application.

In some implementations, the transaction state indicates a status of the order without a communication from the blockchain application.

In some implementations, the transaction state of the order object is updated to indicate one or more statuses of the order according to one or more updates. A status of the transaction state reflects at least one of: a purchased status indicating that the payment for the order has been obtained, an order fulfilled status indicating that the non-fungible token has been generated on the blockchain for the order, a timeout status indicating that a timer associated with the order object has expired, or a condition failure status indicating that a condition for generating the non-fungible token for the order has failed.

In some implementations, the method further comprises generating, by the computer, a notification indicating the transaction state of the order object according to a second update, the second update reflecting that the non-fungible token has been generated on the blockchain for the blockchain wallet address of the purchaser associated with the particular order; and transmitting, by the computer, the notification to at least one of a client device of the purchaser and a merchant server hosting the merchant webpage.

In some implementations, the method further comprises receiving, by the computer, configuration instructions for the product object via a configuration webpage; and generating, by the computer, the product object according to the configuration instructions.

In some implementations, the method further comprises receiving, by the computer, configuration instructions for the product object via a configuration webpage; and generating, by the computer, machine-executable code of a smart contract according to the configuration instructions.

In some implementations, the instruction to generate the non-fungible token on the blockchain application for the order initiates execution of the smart contract.

In some implementations, the transaction state indicates awaiting payment. The method further comprises generating, by the computer, the update to the transaction state in response to receiving the payment for the particular payment.

In some implementations, the method further comprises generating, by the computer, a second update to the transaction state to reflect an order fulfillment in response to the non-fungible token being generated on the blockchain for the blockchain wallet address of the purchaser.

In some implementations, the method further comprises receiving, by the computer, a second update of the transaction state of the order object from the merchant webpage.

In some implementations, the blockchain wallet address is a new blockchain wallet address created for the purchaser after the payment for order and before the non-fungible token is generated on the blockchain.

In some implementations, the blockchain wallet address is retrieved from the purchaser via an email after the payment for order and before the non-fungible token is generated on the blockchain.

In some implementations, for each order the computer receives a purchase request for the order into a queue memory.

In some implementations, the computer transmits the instruction to the blockchain application to generate the non-fungible token on the blockchain further responsive to a condition being satisfied.

In some implementations, the method further comprises detecting, by the computer, the condition associated with the order, wherein the condition is associated with at least one of a gas fee, a time of day, and usage of a memory queue configured to store the purchase request.

In some embodiments, a system for managing transaction operations and blockchain operations comprises a computer comprising a processor and configured to: receive a plurality of orders via a merchant webpage for a product object representing a non-fungible token; for each order of the plurality of orders, generate an order object indicating the product object and a transaction state associated with a particular order of a purchaser; and responsive to an update to the transaction state reflecting that a payment for the particular order has been obtained, transmit an instruction to a blockchain application to generate the non-fungible token on a blockchain for a blockchain wallet address of the purchaser.

In some implementations, the computer transmits the instruction to the blockchain application to generate the non-fungible token on the blockchain for one or more orders of the plurality of orders having the transaction state reflecting that the payment for each order of the one or more orders has been obtained.

In some implementations, the update to the transaction state reflects that the payment has been obtained without awaiting completion of execution of the instruction by the blockchain application.

In some implementations, the transaction state indicates a status of the order without a communication from the blockchain application.

In some implementations, the transaction state of the order object is updated to indicate one or more statuses of the order according to one or more updates. A status of the transaction state reflects at least one of: a purchased status indicating that the payment for the order has been obtained, an order fulfilled status indicating that the non-fungible token has been generated on the blockchain for the order, a timeout status indicating that a timer associated with the order object has expired, or a condition failure status indicating that a condition for generating the non-fungible token for the order has failed.

In some implementations, the computer is further configured to generate a notification indicating the transaction state of the order object according to a second update, the second update reflecting that the non-fungible token has been generated on the blockchain for the blockchain wallet address of the purchaser associated with the particular order; and transmit the notification to at least one of a client device of the purchaser and a merchant server hosting the merchant webpage.

In some implementations, the computer is further configured to receive configuration instructions for the product object via a configuration webpage; and generate the product object according to the configuration instructions.

In some implementations, the computer is further configured to receive configuration instructions for the product object via a configuration webpage; and generate machine-executable code of a smart contract according to the configuration instructions.

In some implementations, the instruction to generate the non-fungible token on the blockchain application for the order initiates execution of the smart contract.

In some implementations, the transaction state indicates awaiting payment, and wherein the method further comprises generating, by the computer, the update to the transaction state in response to receiving the payment for the particular payment.

In some implementations, the computer is further configured to generate a second update to the transaction state to reflect an order fulfillment in response to the non-fungible token being generated on the blockchain for the blockchain wallet address of the purchaser.

In some implementations, the computer is further configured to receive a second update of the transaction state of the order object from the merchant webpage.

In some implementations, the blockchain wallet address is a new blockchain wallet address created for the purchaser after the payment for order and before the non-fungible token is generated on the blockchain.

In some implementations, for each order the computer receives a purchase request for the order into a queue memory.

In some implementations, the computer transmits the instruction to the blockchain application to generate the non-fungible token on the blockchain further responsive to a condition being satisfied.

In some implementations, the computer is further configured to detect the condition associated with the order, and wherein the condition is associated with at least one of a gas fee, a time of day, and usage of a memory queue configured to store the purchase request.

In some embodiments, a machine-readable storage medium having computer-executable instructions stored thereon that, when executed by one or more processors, cause the one or more processors to perform operations comprising: receiving a plurality of orders via a merchant webpage for a product object representing a non-fungible token; for each order of the plurality of orders, generating an order object indicating the product object and a transaction state associated with a particular order of a purchaser; and responsive to an update to the transaction state reflecting that a payment for the particular order has been obtained, transmitting an instruction to a blockchain application to generate the non-fungible token on a blockchain for a blockchain wallet address of the purchaser.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, attributes, or memory contents. Information, arguments, attributes, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
   receiving, by a computer, a plurality of orders via a merchant webpage for a product object representing a non-fungible token;
   for each order of the plurality of orders, generating, by the computer, an order object indicating the product object and a transaction state associated with a particular order of a purchaser;
   storing each of the order objects in a queue memory;
   for each order, initiating a corresponding payment transaction through one of a plurality of payment gateways;
   while continuing to receive orders and generating order objects associated with the product object, receiving off-chain data relating to the transaction state of the particular order; and
   responsive to an update to the transaction state reflecting that a payment for the particular order has been obtained and irrespective of its order in the queue memory, transmitting, by the computer, an instruction to a blockchain application to generate the non-fungible token on a blockchain for a blockchain wallet address of the purchaser.

2. The method according to claim 1, wherein the computer transmits the instruction to the blockchain application to generate the non-fungible token on the blockchain for one or more orders of the plurality of orders having the transaction state reflecting that the payment for each order of the one or more orders has been obtained.

3. The method according to claim 1, wherein the update to the transaction state reflects that the payment has been obtained without awaiting completion of execution of the instruction by the blockchain application.

4. The method according to claim 1, wherein the transaction state indicates a status of the order without a communication from the blockchain application.

5. The method according to claim 1, wherein the transaction state of the order object is updated to indicate one or more statuses of the order according to one or more updates, and wherein a status of the transaction state reflects at least one of:
   a purchased status indicating that the payment for the order has been obtained, an order fulfilled status indicating that the non-fungible token has been generated on the blockchain for the order,
   a timeout status indicating that a timer associated with the order object has expired, or
   a condition failure status indicating that a condition for generating the non-fungible token for the order has failed.

6. The method according to claim 1, further comprising:
   generating, by the computer, a notification indicating the transaction state of the order object according to a second update, the second update reflecting that the non-fungible token has been generated on the blockchain for the blockchain wallet address of the purchaser associated with the particular order; and
   transmitting, by the computer, the notification to at least one of a client device of the purchaser and a merchant server hosting the merchant webpage.

7. The method according to claim 1, further comprising:
   receiving, by the computer, configuration instructions for the product object via a configuration webpage; and
   generating, by the computer, the product object according to the configuration instructions.

8. The method according to claim 1, further comprising:
   receiving, by the computer, configuration instructions for the product object via a configuration webpage; and
   generating, by the computer, machine-executable code of a smart contract according to the configuration instructions.

9. The method according to claim 8, wherein the instruction to generate the non-fungible token on the blockchain application for the order initiates execution of the smart contract.

10. The method according to claim 1, wherein the transaction state indicates awaiting payment, and wherein the method further comprises generating, by the computer, the update to the transaction state in response to receiving the payment for the particular payment.

11. The method according to claim 1, further comprising generating, by the computer, a second update to the transaction state to reflect an order fulfillment in response to the non-fungible token being generated on the blockchain for the blockchain wallet address of the purchaser.

12. The method according to claim 1, further comprising receiving, by the computer, a second update of the transaction state of the order object from the merchant webpage.

13. The method according to claim 1, wherein the blockchain wallet address is a new blockchain wallet address created for the purchaser after the payment for order and before the non-fungible token is generated on the blockchain.

14. The method according to claim 1, wherein the blockchain wallet address is retrieved from the purchaser via an email after the payment for order and before the non-fungible token is generated on the blockchain.

15. The method according to claim 1, wherein the computer transmits the instruction to the blockchain application to generate the non-fungible token on the blockchain further responsive to a condition being satisfied.

16. The method according to claim 1, further comprising detecting, by the computer, the condition associated with the order, wherein the condition is associated with at least one of a gas fee, a time of day, and usage of a memory queue configured to store the purchase request.

17. A system for managing transaction operations and blockchain operations, the system comprising:
 computer comprising a hardware processor and configured to execute instructions to:
 receive a plurality of orders via a merchant webpage for a product object representing a non-fungible token;
 for each order of the plurality of orders, generate an order object indicating the product object and a transaction state associated with a particular order of a purchaser;
 store each of the order objects in a queue memory;
 for each order, initiate a corresponding payment transaction through one of a plurality of payment gateways;
 while continuing to receive orders and generating order objects associated with the product object, receive off-chain data relating to the transaction state of the particular order; and
 responsive to an update to the transaction state reflecting that a payment for the particular order has been obtained and irrespective of its order in the queue memory, transmit an instruction to a blockchain application to generate the non-fungible token on a blockchain for a blockchain wallet address of the purchaser.

18. The system according to claim 17, wherein the computer transmits the instruction to the blockchain application to generate the non-fungible token on the blockchain for one or more orders of the plurality of orders having the transaction state reflecting that the payment for each order of the one or more orders has been obtained.

19. The system according to claim 17, wherein the update to the transaction state reflects that the payment has been obtained without awaiting completion of execution of the instruction by the blockchain application.

20. The system according to claim 17, wherein the transaction state indicates a status of the order without a communication from the blockchain application.

21. The system according to claim 17, wherein the transaction state of the order object is updated to indicate one or more statuses of the order according to one or more updates, and wherein a status of the transaction state reflects at least one of:
 a purchased status indicating that the payment for the order has been obtained,
 an order fulfilled status indicating that the non-fungible token has been generated on the blockchain for the order,
 a timeout status indicating that a timer associated with the order object has expired, or
 a condition failure status indicating that a condition for generating the non-fungible token for the order has failed.

22. The system according to claim 17, wherein the computer is further configured to:
 generate a notification indicating the transaction state of the order object according to a second update, the second update reflecting that the non-fungible token has been generated on the blockchain for the blockchain wallet address of the purchaser associated with the particular order; and
 transmit the notification to at least one of a client device of the purchaser and a merchant server hosting the merchant webpage.

23. The system according to claim 17, wherein the computer is further configured to:
 receive configuration instructions for the product object via a configuration webpage; and
 generate the product object according to the configuration instructions.

24. The system according to claim 17, wherein the computer is further configured to:
 receive configuration instructions for the product object via a configuration webpage; and
 generate machine-executable code of a smart contract according to the configuration instructions.

25. The system according to claim 24, wherein the instruction to generate the non-fungible token on the blockchain application for the order initiates execution of the smart contract.

26. The system according to claim 17, wherein the transaction state indicates awaiting payment, and wherein the method further comprises generating, by the computer, the update to the transaction state in response to receiving the payment for the particular payment.

27. The system according to claim 17, wherein the computer is further configured to generate a second update to the transaction state to reflect an order fulfillment in response to the non-fungible token being generated on the blockchain for the blockchain wallet address of the purchaser.

28. The system according to claim 17, wherein the computer is further configured to receive a second update of the transaction state of the order object from the merchant webpage.

29. The system according to claim 17, wherein the blockchain wallet address is a new blockchain wallet address created for the purchaser after the payment for order and before the non-fungible token is generated on the blockchain.

30. The system according to claim 17, wherein the computer transmits the instruction to the blockchain application to generate the non-fungible token on the blockchain further responsive to a condition being satisfied.

31. The system according to claim 17, wherein the computer is further configured to detect the condition associated with the order, and wherein the condition is associated with at least one of a gas fee, a time of day, and usage of a memory queue configured to store the purchase request.

32. A non-transitory machine-readable storage medium having computer-executable instructions stored thereon that, when executed by one or more processors, cause the one or more processors to perform operations comprising:
 receiving a plurality of orders via a merchant webpage for a product object representing a non-fungible token;
 for each order of the plurality of orders, generating an order object indicating the product object and a transaction state associated with a particular order of a purchaser;
 store each of the order objects in a queue memory;
 for each order, initiate a corresponding payment transaction through one of a plurality of payment gateways;
 while continuing to receive orders and generating order objects associated with the product object, receive off-chain data relating to the transaction state of the particular order; and
 responsive to an update to the transaction state reflecting that a payment for the particular order has been obtained and irrespective of its order in the queue memory, transmit an instruction to a blockchain application to generate the non-fungible token on a blockchain for a blockchain wallet address of the purchaser.

\* \* \* \* \*